US010388109B2

(12) United States Patent
Shoenhair et al.

(10) Patent No.: US 10,388,109 B2
(45) **Date of Patent: *Aug. 20, 2019**

(54) MULTI-HAND BET WITH ESCALATING PAYOUTS

(71) Applicant: Zynga Inc., San Francisco, CA (US)

(72) Inventors: Thomas Arthur Shoenhair, Lafayette, CA (US); Bradley James Harrison, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,864

(22) Filed: Dec. 5, 2017

(65) Prior Publication Data

US 2018/0096562 A1 Apr. 5, 2018

Related U.S. Application Data

(63) Continuation of application No. 14/306,079, filed on Jun. 16, 2014, now Pat. No. 9,875,615.

(51) Int. Cl.
*A63F 13/00* (2014.01)
*G07F 17/32* (2006.01)

(52) U.S. Cl.
CPC ........ *G07F 17/3258* (2013.01); *G07F 17/326* (2013.01)

(58) Field of Classification Search
CPC ... G07F 17/32; G07F 17/3244; G07F 17/3234
USPC ...................................................... 463/16–42
See application file for complete search history.

(56) References Cited

U.S. PATENT DOCUMENTS

| | | | | |
|---|---|---|---|---|
| 8,038,527 | B2 * | 10/2011 | Walker ................. | G06Q 40/025 273/146 |
| 2006/0079309 | A1 * | 4/2006 | Walker .................... | G07F 17/32 463/13 |
| 2006/0089195 | A1 * | 4/2006 | Walker .............. | G06Q 30/0283 463/25 |
| 2007/0254732 | A1 * | 11/2007 | Walker .................... | G07F 17/32 463/16 |
| 2009/0005145 | A1 * | 1/2009 | White ..................... | G07F 17/32 463/16 |
| 2009/0111557 | A1 * | 4/2009 | Jankowski .......... | G07F 17/3244 463/20 |

(Continued)

*Primary Examiner* — Masud Ahmed
(74) *Attorney, Agent, or Firm* — Penilla IP, APC

(57) ABSTRACT

Methods, systems, and computer programs are presented for providing games with multi-hand bets with escalating payouts. One method includes an operation for providing an interface for a betting game, the interface including an option to select single or multiple turn bets. Additionally, the method includes an operation for detecting a player selection of the multiple-turn bet, which has a plurality of single turns, each single turn being associated with a respective payout multiplier. The method executes game operations for each single turn until the player loses or until the player plays the last turn, and calculates the total winnings, which are equal to the sum of winnings from each single turn. The winnings from each single turn are equal to the respective payout multiplier times the winnings determined from a payout table. In addition, the method includes an operation for providing the total winnings, if any, to the player.

18 Claims, 7 Drawing Sheets

(56) References Cited

U.S. PATENT DOCUMENTS

2012/0196666 A1* 8/2012 Moody .................. G07F 17/32
463/13

* cited by examiner

MULTI-HAND BET WITH ESCALATING PAYOUTS

CLAIM OF PRIORITY

This application is a continuation of U.S. application Ser. No. 14/306,079, filed on Jun. 16, 2014, and titled, "Multi-Hand Bet with Escalating Payouts," which is incorporated herein by reference in its entirety.

BACKGROUND

1. Field of the Invention

The present embodiments relate to methods for providing an online game, and more particularly, methods, systems, and computer programs for providing an online game with different betting options.

2. Description of the Related Art

Online betting games have become very popular, including casino-style games, such as video slots, online poker, video poker, blackjack, etc. In order to make games more interesting, game providers try to offer alternatives within the game to increase their variability, challenges, and bonus games.

However, many of the online games simply simulate game experience of a player played in a casino, which makes these online games similar with little differentiation from each other, resulting in a lack of customer loyalty.

Increasing the options available to a player in the game improves customer experience, which results in longer playing periods of engagement. Also, by improving customer experience, game providers may entice new players to play the game. Further, by providing additional game options, players may increase their bet amounts which may result in increasing purchases of game currency.

Game options are desired that improve customer satisfaction with the game. It is in this context that embodiments arise.

SUMMARY

Methods, devices, systems, and computer programs are presented for providing games with multi-hand bets and escalating payouts. It should be appreciated that the present embodiments can be implemented in numerous ways, such as a method, an apparatus, a system, a device, or a computer program on a computer readable medium. Several embodiments are described below.

In one embodiment, a method is presented. The method includes an operation for providing an interface to a player for playing a betting game, where the interface includes an option to select a single-turn bet or a multiple-turn bet. Additionally, the method includes an operation for detecting a player selection of the multiple-turn bet, which is being associated with a plurality of single turns, where each single turn is associated with a respective payout multiplier. Further, the method executes game operations for each single turn until the player loses one of the single turns, or until the player plays a last single turn from the plurality of single turns, and calculates the total winnings for the multiple-turn bet after executing the game operations. The total winnings are the player's cumulative winnings from all three hands. After hand 1 the total winnings displays the winnings from hand 1; after hand 2 the total winnings displays the combined winnings from hands 1 and 2, and so forth. Therefore, the total winnings are equal to the sum of winnings from each single turn played, and the winnings from each single turn played is equal to the respective payout multiplier times the winnings determined from a payout table. In addition, the method includes an operation for providing the total winnings, if any, to the player. In one embodiment, the operations of the method are executed by a processor.

In another embodiment, a method includes an operation for providing an interface to a player for playing a video poker game, the interface including an option to select a single-hand bet or a triple-hand bet. In addition, the method includes an operation for detecting a player selection of the triple-hand bet, the triple-hand bet including a first hand, a second hand associated with a second multiplier, and a third hand associated with a third multiplier. The third multiplier is greater than the second multiplier, and the second multiplier is greater than 1. Further, the method includes operations for executing game operations for the first hand, and, if the player wins the first hand the: determining the first hand winnings as a payout of the first hand from a payout table; and executing game operations for the second hand. Further, the method includes another operation where, if the player wins the second hand, then the method: determines the second hand winnings equal to the second multiplier times a payout of the second hand from the payout table; and the method plays the third hand. Further yet, if the player wins the third hand, the method determines the third hand winnings equal to the third multiplier times a payout of the third hand from the payout table. Additionally, the method includes an operation for providing to the player the first hand winnings if any, the second hand winnings if any, and the third hand winnings if any. In one embodiment, the operations of the method are executed by a processor.

In yet another embodiment, a non-transitory computer-readable storage medium stores a computer program, the computer-readable storage medium comprising program instructions for providing an interface to a player for playing a betting game, the interface including an option to select a single turn bet or a multiple turn bet. Further, the storage medium includes program instructions for detecting a player selection of the multiple turn bet, the multiple turn bet being associated with a plurality of single turns, wherein each single turn is associated with a respective payout multiplier, and program instructions for executing game operations for each single turn until the player loses one of the single turns or until the player plays a last single turn from the plurality of single turns. In addition, the storage medium includes program instructions for calculating a total winnings for the multiple turn bet after executing the game operations, where the total winnings is equal to a sum of winnings from each single turn played, and the winnings from each single turn played is equal to the respective payout multiplier times winnings determined from a payout table. Further, the storage medium includes program instructions for providing the total winnings, if any, to the player.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, devices, systems, and computer programs for providing games with multi-hand bets and escalating payouts. It will be apparent, that the present embodiments may be practiced without some or all of these specific details. In other instances, well-known process operations have not been described in detail in order not to unnecessarily obscure the present embodiments.

Figure 1:
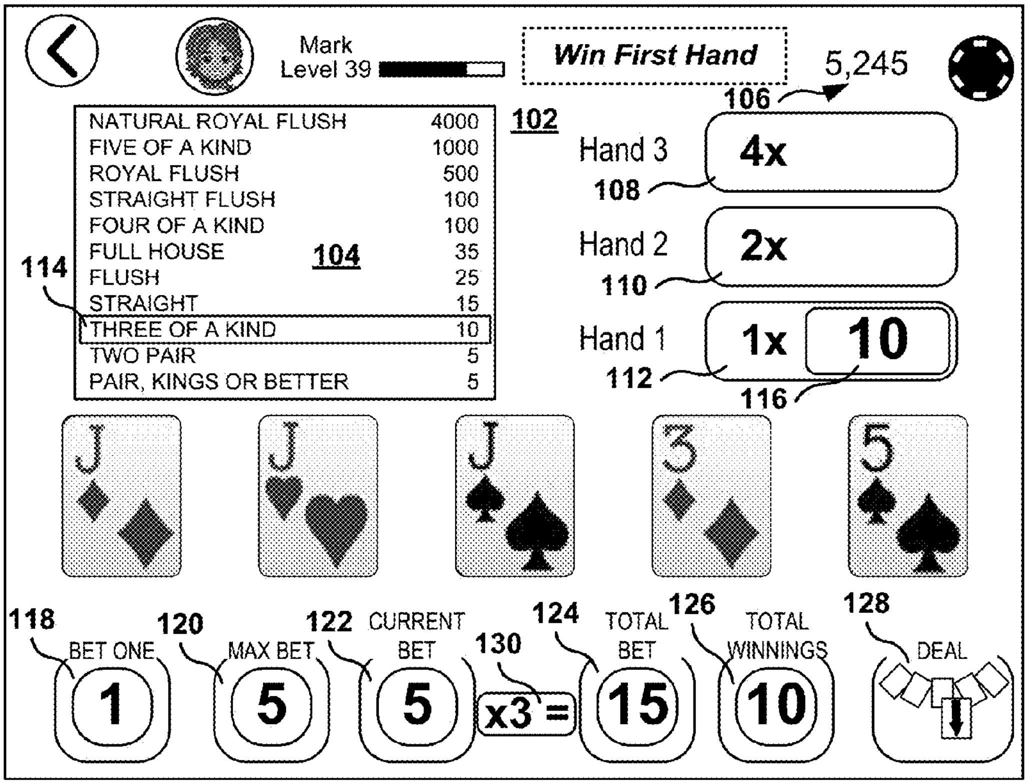
FIG. 1 depicts an interface for playing a video poker game, according to one embodiment.

FIG. 1 depicts an interface 102 for playing a video poker game, according to one embodiment. Interface 102 includes the end of a hand of Kings-or-Better video poker. In one embodiment, the Kings-or-Better game includes dealing five cards, wait for the player to select which of the five cards the player wishes to keep (e.g., Hold), and then dealing new cards, if any, for those cards that have not been put on hold. After the second deal, the game determines if the player has won by checking the player's cards against payout table 104.

To initiate the hand, the player selects how much to bet by selecting button 118 or by selecting button 120. In this embodiment, the maximum bet is 5 units. The current bet 122 is the total bet for all three hands in a single game of "Triple Play." (In our example, the player made a max bet 120 of 5, so the current bet 122 is 15, which is equal to 3 times the single-hand bet.)

Every time the player selects button 118, the current bet amount 122 is increased by 1, up until the maximum bet 120 is reach (e.g., 5). Therefore, the player may bet 1, 2, 3, 4, or 5 units. If the player selects button 120, the current bet 122 is immediately sent to the maximum bet. Currency counter 106 indicates how much game currency the user has (e.g., 5,245), which is also referred to as the player's bank. For description purposes, the game currency is described herein as units, which may represent virtual currency or real-money currency, or any combination thereof.

Embodiments presented herein provide an option for the player to play what is called triple play. Triple play poker is a multi-hand video poker variant in which the player can win bigger multiplier payouts by winning multiple hands in a row. However, the triple play is not simply betting on three independent video poker hands, because there is a correlation among the three hands to be played. To start the triple play, the player plays the first hand. If the player loses that hand the player doesn't play hands 2 and 3, and the player loses triple the bet for a single hand, because the player is still betting on three hands. However, if the player wins the first hand, then the player gets to play the second hand. If the player loses the second hand, then the player doesn't play the third hand, but if the player wins the second hand, then the player gets to play the third hand. After the third hand is played the triple play is over, independent of whether the third hand is won or lost.

In the exemplary embodiment of FIG. 1, the player is given the option to play a single hand or a triple hand. If the player wishes to bet on the triple play, then the player selects button 130, which includes a symbol "×3=" signifying that the current bet 122 is multiplied by three because the player is betting on three hands. The total bet is shown in field 124. In other embodiments, when the player selects the triple-play game, every hand is a triple play hand and button 130 is replaced with the message "3×=". The total bet is equal to the number of single turns times the current bet, when the multiple-turn bet is selected, and the total bet is equal to the current bet when the multiple-turn bet is not selected.

After betting, the hand starts when the player selects button 128. Five cards are dealt and the player is given the option of holding (e.g., keeping) each of the cards or not (not shown). After making the selection, the player selects button 128 to draw new cards for the cards that were not held. After the new cards are dealt, the game determines if the player has won or lost based on payout table 114.

Interface 102 illustrates the video poker display at the end of the first hand after the player has won the first hand. In this case, the player has three jacks, and payout table 104 indicates that "three of a kind" pays 10 units. In one embodiment, the winning combination is highlighted 114, such as by framing the winning combination, changing the font, changing the color of the winning combination, etc.

The interface 102 further includes results boxes for hand 1 112, hand 2 110, and hand 3 108. Hand 1 includes a message "1×" indicating that the winnings for hand 1 are counted as 1 times the pay from the payout table (e.g., the winnings of hand 1 are equal to the winnings indicated in payout table 104). Hand 2 includes message "2×" indicating that the winnings for hand 2 are double the winnings of hand 1 for the same card combinations. In other words, hand 2 has a multiplier of 2. Similarly, hand 3 has a multiplier of 4. Therefore, the player has the incentive of betting on the triple play, because if the player gets to play the second or third hands the winnings increase substantially.

At the end of the first hand, the total winnings count 126 indicates that the player has won 10 units (the result of the first hand). Additionally, at the end of hand 1, hand 1 box 112 also includes message 116 indicating the winnings of the first hand (e.g., 10). At this point, the player starts the second hand by selecting the deal button 128.

In summary, at the start of a hand the player makes three bets of a set amount simultaneously. The player then plays a hand. Payouts on the first hand have a multiplier of 1. If the player wins that first hand, the player is then allowed to play a second hand, with payouts on winning hands paid out at a multiplier of 2 times the normal winnings, as described by the payout table. If the player wins the second hand, the player is then allowed to play a third hand, where the winning payout is paid at a multiplier of 4 times the normal winnings.

It is noted that, although the player pays for all three hands at the start, the player only gets to play subsequent hands if the player wins the previous hands (after the last hand). That is, the player never plays for 4× unless the player wins at the 1× and 2× levels.

Embodiments are presented herein with reference to a video poker game of Kings Or Better, but the same or similar principles apply to other kinds of video poker games, such as Jacks or Better, Deuces Wild, etc. Further, the principles presented herein may be applied to any betting game or game of chance, such as Jacks or Better Video poker, Kings or Better video poker, Deuces Wild video poker, Texas Hold'em video poker, Joker Wild video poker, Tens or Better video poker, Caribbean stud poker, Hi-Lo, Black Jack, Roulette, Slots, Craps, Pachinko, or Keno. Further, besides casino games, the betting games may be other types of games such as skill games, trivia games, shooting games, fighting games, etc.

The embodiments presented may be applied to real-life money gambling only when their implementation, all or in part, follow the pertinent rules and regulations for real-money gambling. Further, in one embodiment, the game includes a random number generator, and for real-money gambling, the random number generator follows the prescribed rules and regulations. In addition, for real-money gambling, certain features may be adjusted or modified to follow the prescribed rules and regulations.

For description purposes, the term "turn," as used herein, includes an option to bet in a game and the execution of one or more game operations until a determination is made whether the player has won or lost based on the game operations. Of course, sometimes the player may bet on multiple turns in advance, but the identification of each turn is based on the game operations that determine if the player has won or lost the bet associated with the turn. For example, in poker a turn is called a hand, and the hand may include an initial dealing of cards, followed by a discard of cards, and a new dealing of cards. After the second deal, a determination is made of whether the player won or lost. As used herein, a multiple-turn game includes a plurality of turns, such that within each turn a determination is made whether the player has won or lost. In one embodiment, loosing means the end of the multiple-turn game, but in other embodiments, the player may continue if the rules allow it. For example, in one embodiment, a multiple-turn game includes 10 turns and allows the player to continue until the player loses two turns or plays all 10 turns.

Further, in a multiple-turn game the final winnings are not determined until the player ends playing all the possible turns according to the rules of the multiple-turn game (e.g., in a triple-play game, the player may play one hand, two hands, or three hands).

In some embodiments, a turn may be any of a video poker hand, a spin of wheels in slots, a hand of blackjack, a spin of a roulette wheel, a roll of the dice, a hand of hi-lo, etc.

It is noted that the embodiments presented herein may be implemented in any computing platform having a display. For example, the game may be played on a personal computer, a tablet, a smart phone, a mobile device, a slots machine, etc. In addition, the inputs for playing the game may be entered via keyboard, mouse, touchscreen touches, gestures, voice, etc. In addition, the embodiments presented herein may also be utilized for real-life games (e.g., a game of blackjack with a dealer for dealing cards).

Figure 2:
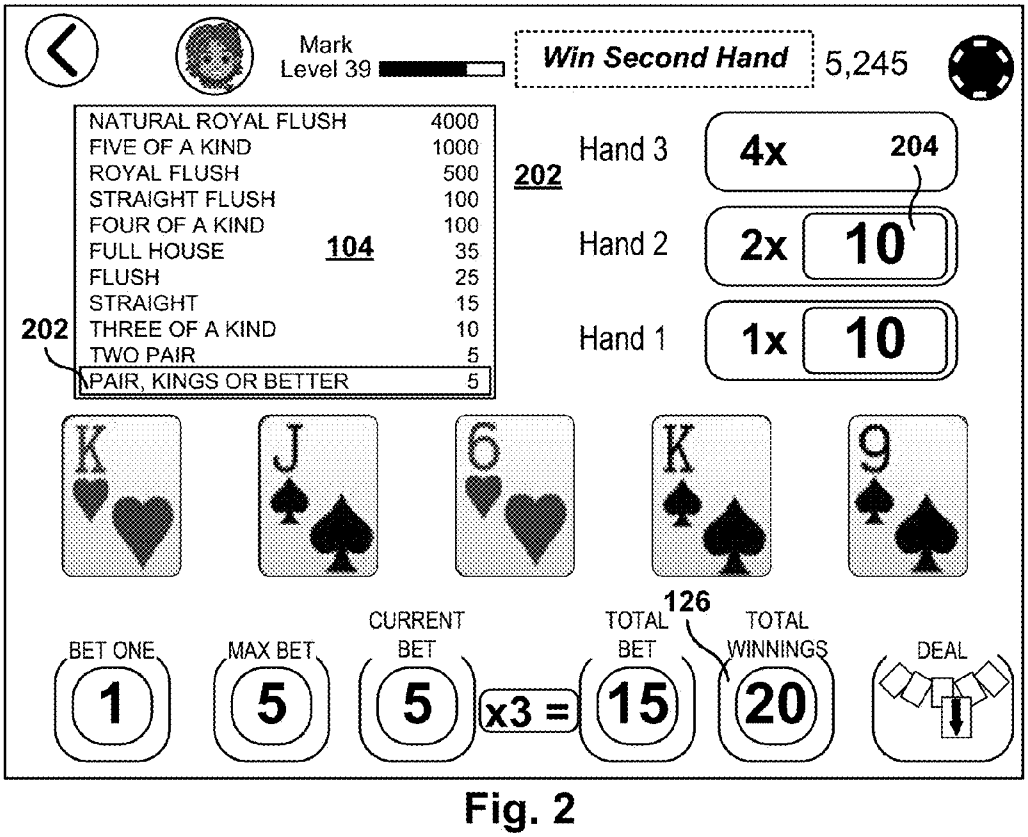
FIG. 2 is an interface illustrating the outcome when the player wins the second hand in a row, according to one embodiment.

FIG. 2 is an interface 202 illustrating the outcome when the player wins the second hand in a row, according to one embodiment. The player plays the first hand, and then if the player wins or ties (e.g., a "push" with the dealer in Blackjack), the player plays the second hand. In interface 202, the player has won the second hand with a pair of Kings.

It is noted that after playing in the first hand, the player does not bet again at this point, because the original bet, placed before the first hand, also covers the second hand (and the third hand too if the player wins the second hand).

If the player wins the second hand, the winnings are doubled, because there is a winning multiplier of 2 in the second hand. The winnings are determined by the payout table 104, and since the pair of Kings is paid at 5, the hand winnings are 10 after applying the multiplier.

The payout tables lists the winnings for all possible winning hands. It is noted that payout table 104 is exemplary, and other games might have different winning combinations and different payouts. For each hand, the payout in number of units is presented (e.g., five of a kind pays at 1000). The payout is based on the current bet for the hand, that is, the payout for each hand is equal to the payout for winning a one-unit bet times the current bet amount. Therefore, in the interface of FIG. 2, if the current bet where 3, then a Full House would pay 21 (current bet of 3 times 7).

In one embodiment, the payout table reflects the payout based on the current bet, according to the following formula:

$$\text{hand payout} = \text{one-unit payout} \times \text{current bet} \tag{1}$$

In another embodiment, the payout table reflects the potential winnings given the current bet and the current hand multiplier. In other words, the formula for the payout table is as follows:

$$\text{hand payout} = \text{one-unit payout} \times \text{current bet} \times \text{hand multiplier} \tag{2}$$

At the end of the second hand, message 204 indicates that the player won 10 units because the player got two Kings. The total winnings 126 is now 20, 10 units won in the first hand and 10 units won in the second hand.

Figure 3:
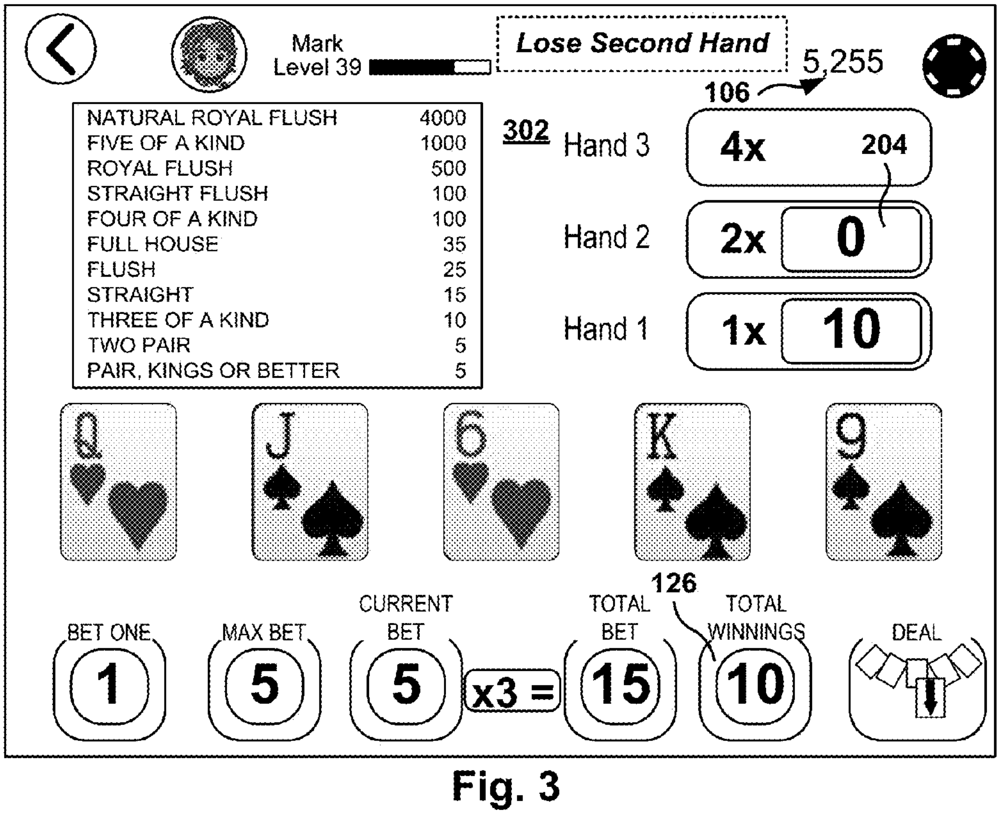
FIG. 3 is an interface illustrating the outcome when the player loses the second hand, according to one embodiment.

FIG. 3 is an interface illustrating the outcome when the player loses the second hand, according to one embodiment. As discussed in FIG. 1, the player has won 10 units in the first hand, an interface 302 illustrates the game after the player loses the second hand.

The total winnings 126 remains at 10, the winnings from the first hand, because there is no winnings in the second hand. The payout table does not have a winning hand highlighted because the player does not have Kings or better. Message 204 illustrates that the winnings from the second are 0.

Further, currency counter 106 has been increased by 10, the total winnings of the triple-play bet. Also, since the player lost the second hand, the multiple-turn bet is over, and that is why the currency counter 106 is updated. At this point, the player may bet again and start a new hand.

It is noted, that different embodiments may include different multipliers and a different number of hands. For example, the number of hands may be any number greater than 1, such as a number of hands in the range from 2 to 100, but other values are also possible.

Additionally, the multipliers may vary from hand to hand. In one embodiment, (such as the one in FIGS. 1-5), the multipliers for the respective hands are 1, 2, and 4. Therefore, the multipliers grow exponentially with a factor of 2. Other multipliers may grow linearly, such as 1×, 2×, 3×,4×, etc., or in any other type of irregular sequence, such as 1×, 1×, 2×, 3×, 20×. In this last sequence, there is a big incentive for the player to get to the fifth hand because the payout increases a great deal in the last hand. In one embodiment, the multiplier for each hand is in the range from 2 to 100, but other values are also possible.

Figure 4:
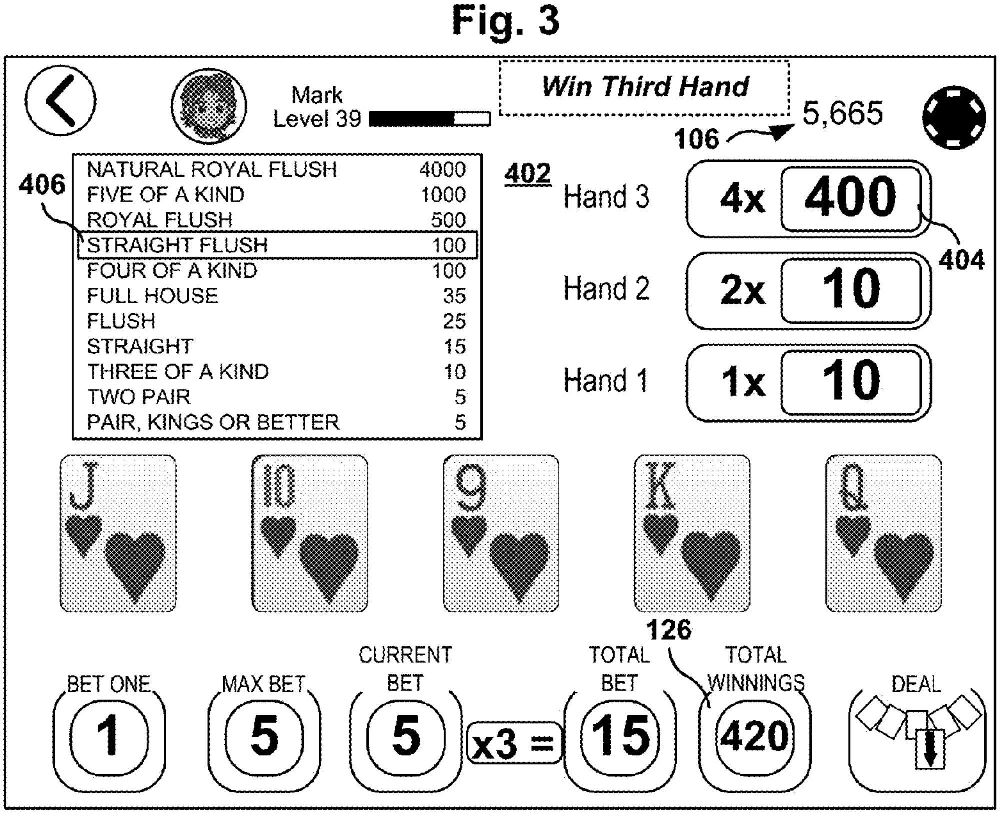
FIG. 4 is an interface illustrating the outcome when the player wins the third hand in a row, according to one embodiment.

FIG. 4 is an interface illustrating the outcome when the player wins the third hand in a row, according to one embodiment. Interface 402 follows interface 202 of FIG. 2, after the player wins the second hand. In the exemplary embodiment of FIG. 4, the player plays the third hand by pressing "Deal" button one more time after playing the second hand. In this example, the player has won the third, and last, hand of the triple-play bet.

The result of the third turn or hand is a straight flush, which pays 100 units as shown in highlighted 406 line of the payout table. Because the multiplier of the third hand is 4, the winnings 404 of the third hand are 400 units. In addition, total winnings 126 shows 420 units, 10 units from hand 1, 10 units from hand 2, and 400 units from hand 3.

Since the triple-play is over at the end of the third hand, the total winnings of 420 are added to the currency counter 106 for a total of 5,665 units. It is noted that, at the beginning of the triple play, the currency counter or bank of the user was 5, 245 units.

At the end of the third hand, the player can play a game at the same-bet level by pressing button 128, or the player can change his bet before playing another turn.

In one embodiment, the parameters of the game regarding payback to the player are adjusted to accommodate for the increase in payout in the second and third hands. For example, the payout table may be changed in all the lines, or in some of the lines. For example, there can be a decrease of 10 to 50% in the payout for the top five winning combinations, in order to keep the payout at a desired overall payout level.

Figure 5:
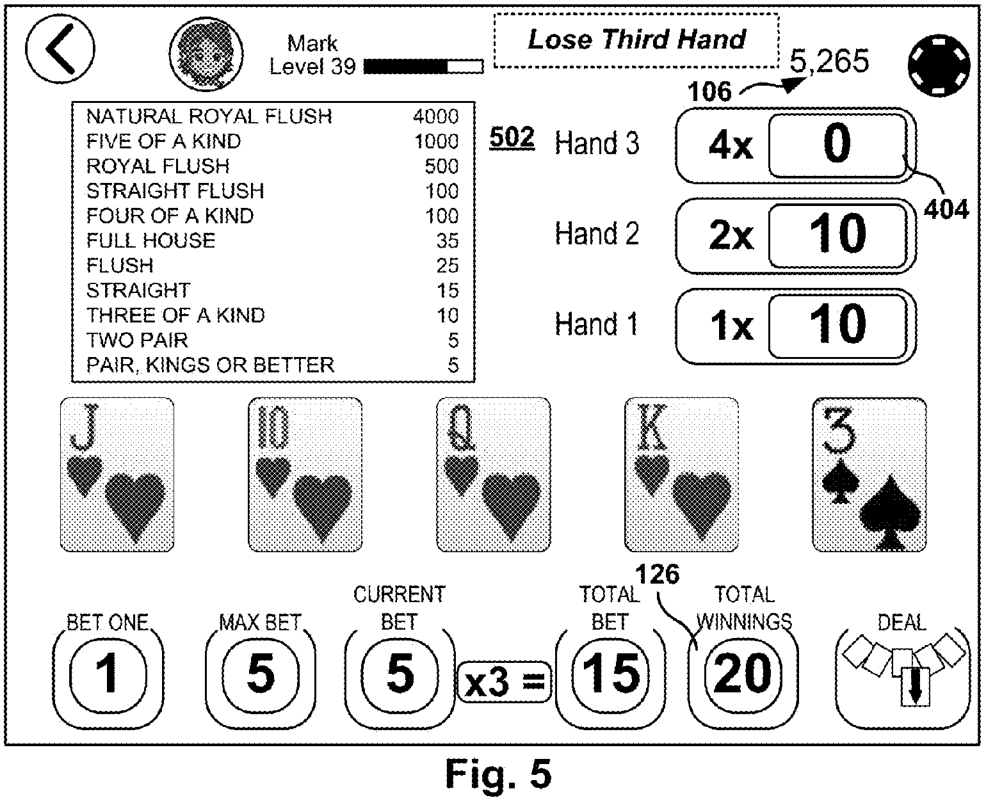
FIG. 5 is an interface illustrating the outcome when the player loses the third hand, according to one embodiment.

FIG. 5 is an interface illustrating the outcome when the player loses the third hand, according to one embodiment. Interface 502 illustrates the outcome after the player wins the second hand (see FIG. 2), plays the third hand, and loses the third hand. The player did not get a winning combination in the third hand, therefore hand 3 winnings 404 are equal to 0. Since the hand 3 winnings are zero, total winnings 126 remains unchanged at 20 units.

Since the triple-play is over at the end of the third hand, the total winnings of 420 are added to the currency counter 106 for a total of 5,245 units. At this point, the player may select to play the triple play again by pressing the deal button, or change the bet before dealing a new hand.

It is noted that the embodiments illustrated in FIGS. 1-5 are exemplary. Other embodiments may utilize different layouts, different games, different number of hands, different multipliers, different payout tables, etc. The embodiments illustrated in FIGS. 1-5 should therefore not be interpreted to be exclusive or limiting, but rather exemplary or illustrative.

Figure 6:
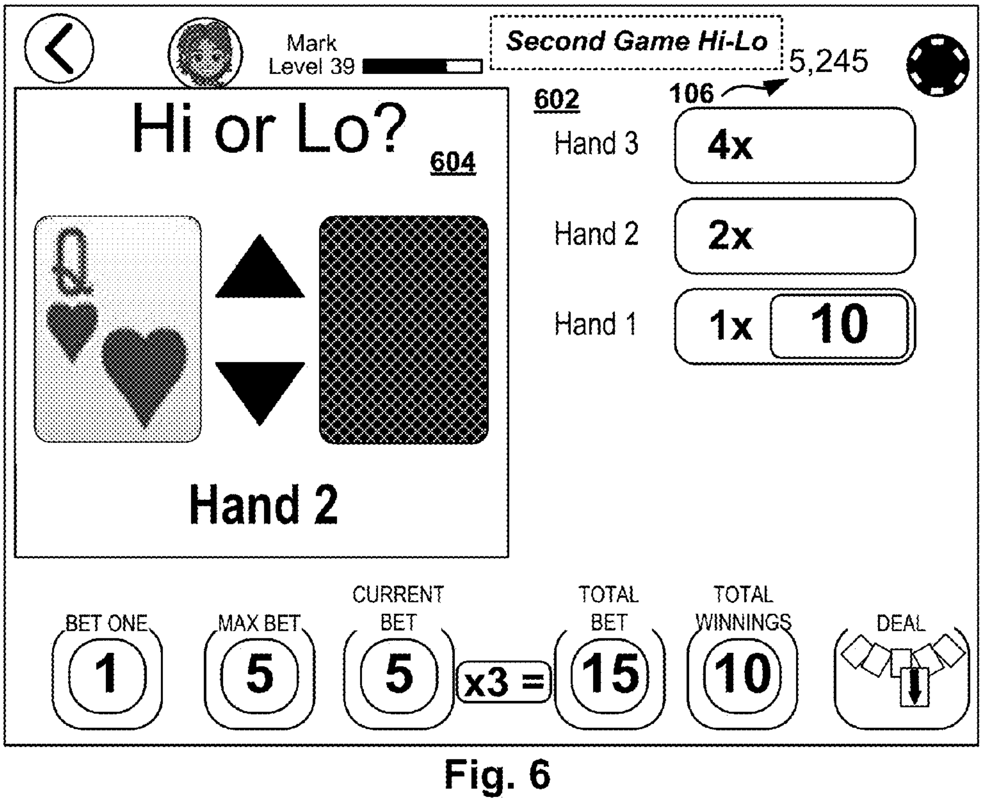
FIG. 6 is an interface illustrating the play of the second hand in a different game than in the first hand, according to one embodiment.

FIG. 6 is an interface illustrating the play of the second hand in a different game than in the first hand, according to one embodiment. In some embodiments, the game played in each turn of the multiple-bet play may be a different game. For example, after winning the first hand of video poker, the player plays a hand of blackjack, and if the player wins at blackjack then the player plays a spin of roulette, and if the player wins at roulette then a game of deuces wild is played, etc.

In addition, the different levels or turns may have different difficulty levels, which may be used as an incentive for the player to bet on a multiple play. For example, the third hand may be a hand of deuces wild with a generous payout table, which combined with the high multiplier for the third hand results in a high probability of a big payout if the player reaches the deuces-wild game.

Interface 602 of FIG. 6 illustrates an embodiment where the second turn is a game of Hi-Lo. After the player won the first hand, a new interface window is presented for playing the game of Hi-Lo. If the player wins the second game, then a new window interface is provided to play a third game, which may be even be another game of video slots.

In one embodiment, the games following the first hand may be chosen at random, so the player may not know what will happen in the second hand if the player wins the first hand. This adds variety and interest to the game.

Figure 7A:
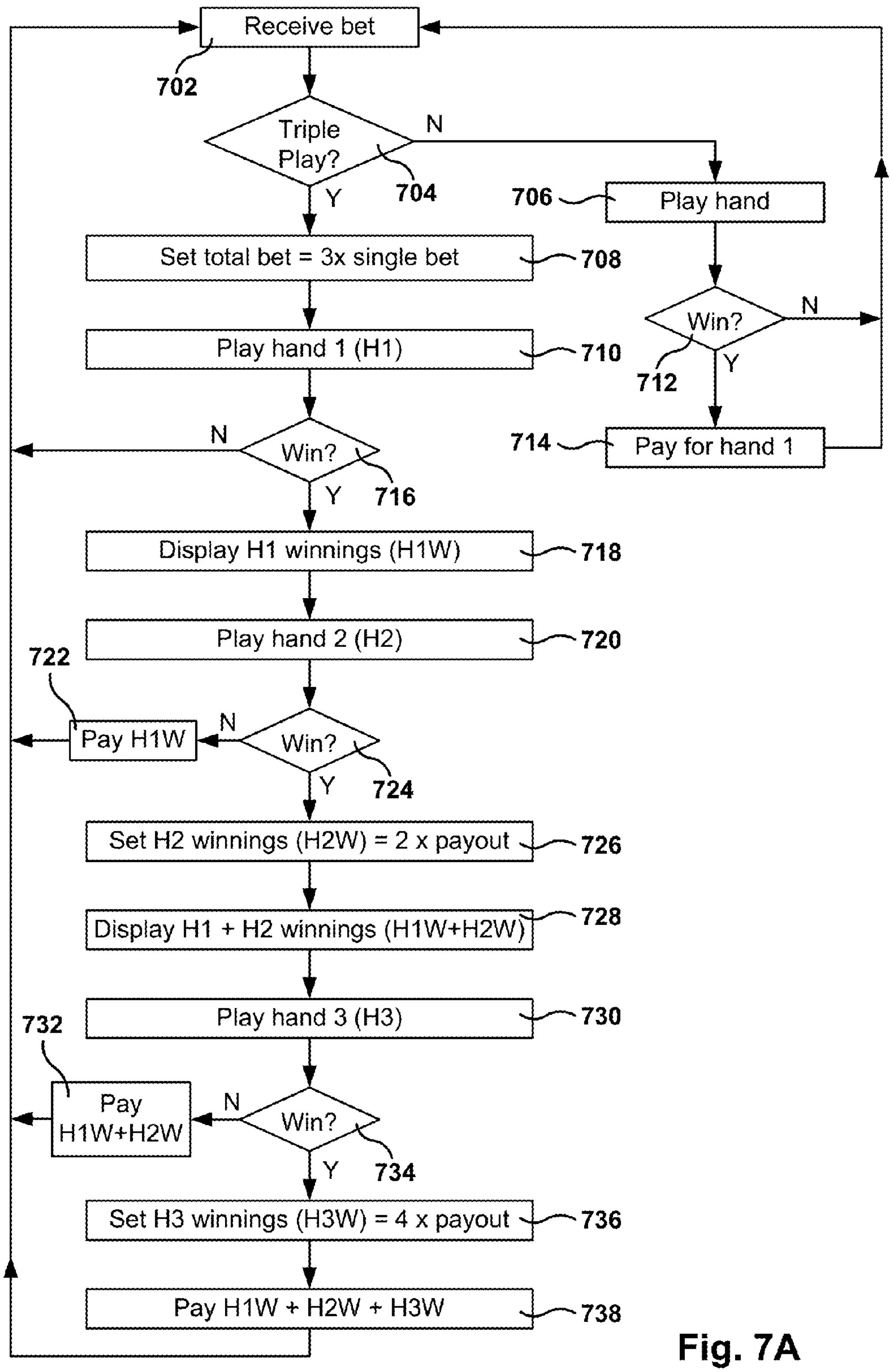
FIG. 7A is a flowchart illustrating an algorithm for providing a triple-play bet, according to one embodiment.

FIG. 7A is a flowchart illustrating an algorithm for providing a triple-play bet, according to one embodiment. While the various operations in this flowchart are presented and described sequentially, one of ordinary skill will appreciate that some or all of the operations may be executed in a different order, be combined or omitted, or be executed in parallel.

In operation 702, a bet is received. From operation 702 the method flows to operation 704, where a determination is made if the bet is for a single turn (e.g., single hand) or for a multiple turn (e.g., triple play). If the bet is not for a triple play, the method flows to operation 706 where a hand of video poker is played. From operation 706 the method flows to operation 712, where a determination is made of whether the player won the hand.

If the player wins the hand in operation 706, the method flows to operation 714 where the game pays the player for winning hand 1. If the player does not win then the method flows back to operation 702.

In operation 708, the total bet is set to be equal to 3 times the single-hand bet. In other embodiments, the bets may vary for the different levels, such as for example with progressive bet levels (e.g., the sequence 1, 1.5, 2, 2.5, etc., for a multilevel game). From operation 708 the method flows to operation 710 where hand 1 (H1) is played.

From operation 710, the method flows to operation 716, where a determination is made on whether the player won hand 1 (H1). If the player did not win H1 then the game goes back to operation 702. If the player won H1, then the method flows to operation 718 where the winnings for H1 (H1W) are displayed.

From operation 718, the method flows to operation 720 were hand 2 (H2) is played. From operation 720 the method flows to operation 724, where a determination is made on whether the player won H2. If the player did not win hand 2, the method flows to operation 722, where the player is paid H1W, and then the method flows back to operation 702.

If the player wins H2, the method flows to operation 726, where the winnings for H2 (H2W) are set to be equal to 2 times the payout of a single hand. From operation 726 the method flows to operation 728 where the winnings for H1 and H2 (H1W and H2W) are displayed on the game interface.

From operation 728, the method flows to operation 730, where hand 3 (H3) is played. In operation 734, at determination is made on whether the player won H3. If the player did not win H,3 the method flows to operation 732, and if the player won H3, then the method flows to operation 736.

In operation 732, the game pays for H1W and H2W and then the method flows back to operation 702. In operation 736, the winnings for the third hand (H3W) are set to be equal to four times the single hand payout (i.e., the multiplier for H3 is 4).

From operation 736 the method flows to operation 738 where the player is paid for her winnings. Since at this point the player has won all three hands, the player gets paid for H1W plus H2W plus H3W. From operation 738, the method flows back to operation 702 to start a new hand.

Figure 7B:
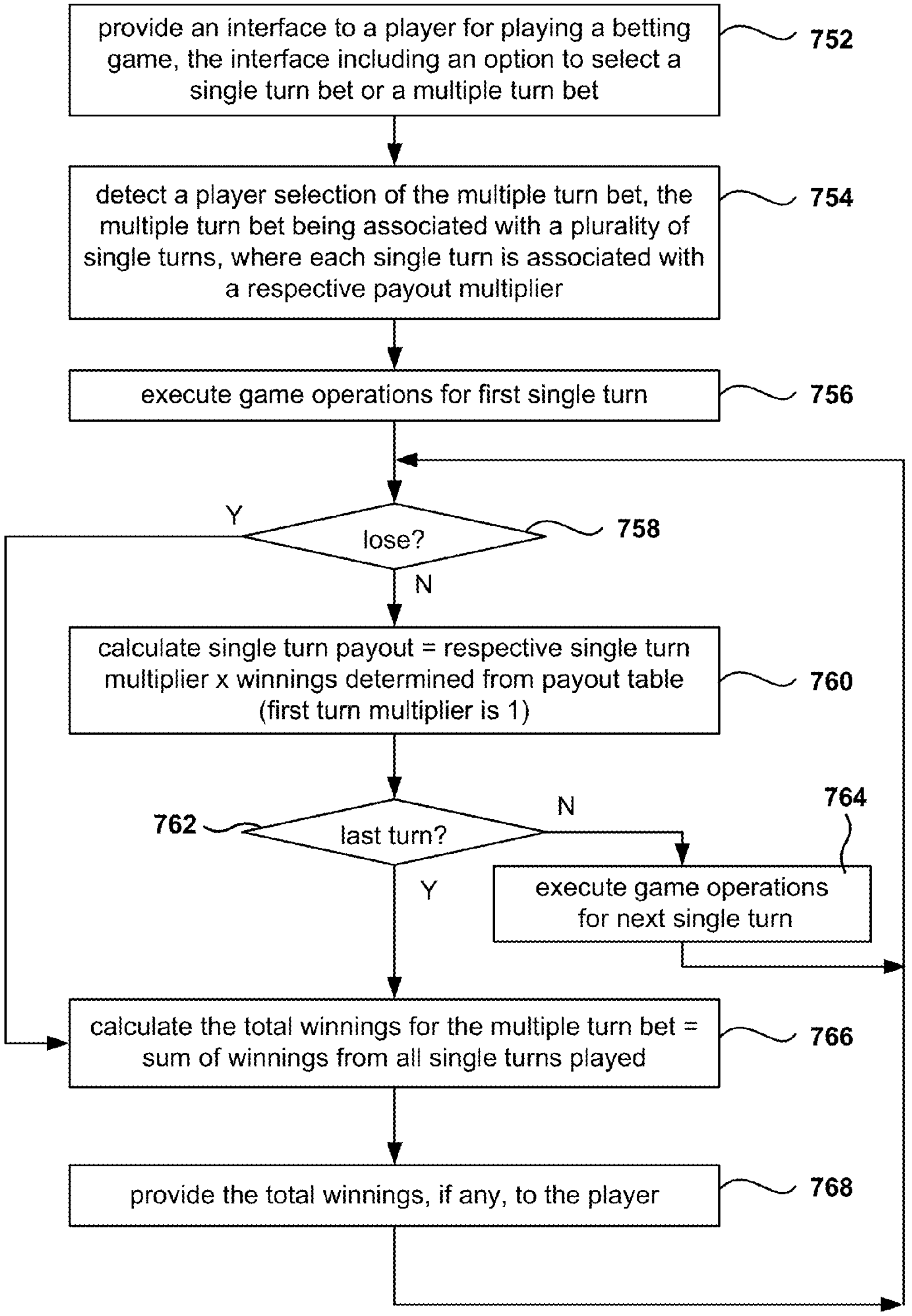
FIG. 7B is a flowchart illustrating an algorithm for providing a game option with a multi-hand bet and escalating payouts, according to one embodiment.

FIG. 7B is a flowchart illustrating an algorithm for providing a game option with a multi-hand bet and escalating payouts, according to one embodiment. While the various operations in this flowchart are presented and described sequentially, one of ordinary skill will appreciate that some or all of the operations may be executed in a different order, be combined or omitted, or be executed in parallel.

In operation 752, a interface is provided to the player for playing a betting game. In one embodiment, the interface includes an option for selecting a single-turn bet or a multiple-turn bet. From operation 752, the method flows to operation 754 where the game detects the player selection of the multiple-turn bet. The multiple-turn bet is associated with a plurality of single turns, where each single turn is associated with a respective payout multiplier.

From operation 754, the method flows to operation 756 where the game operations are executed for the first single turn from the multiple-turn game. From operation 756, the method flows to operation 758, where a determination is made whether the player lost or won. If the player did not lose (i.e., the player won) the method flows to operation 760, and if the player lost then the method flows to operation 766.

In operation 760, the method calculates the single-turn payout as the multiplier of the respective single turn times the winnings determined from the payout table. In one embodiment, the first turn multiplier is 1, but in other embodiments the multiplier of the first-hand may be different from 1.

From operation 760, the method flows to operation 762 where the game determines if the player has played the last turn in the multiple-turn play. If the player played the last turn, the method flows to operation 766, and if the player did not play the last turn, then the method flows to operation 764, where the game operations are executed for the next single turn. From operation 764, the method flows to operation 758.

The number of single turns in a multiple-turn game may vary according to different embodiments. For example, in one embodiment, the number of single turns is in the range from 2 to 10, although other numbers for the number of single turns may also be used.

In operation 766, the total winnings for the multiple-turn bet are calculated as the sum of all the winnings from all the single turns played. From operation 766, the method flows to operation 768 where the total winnings are provided, if any winnings were obtained, to the player.

Figure 8:
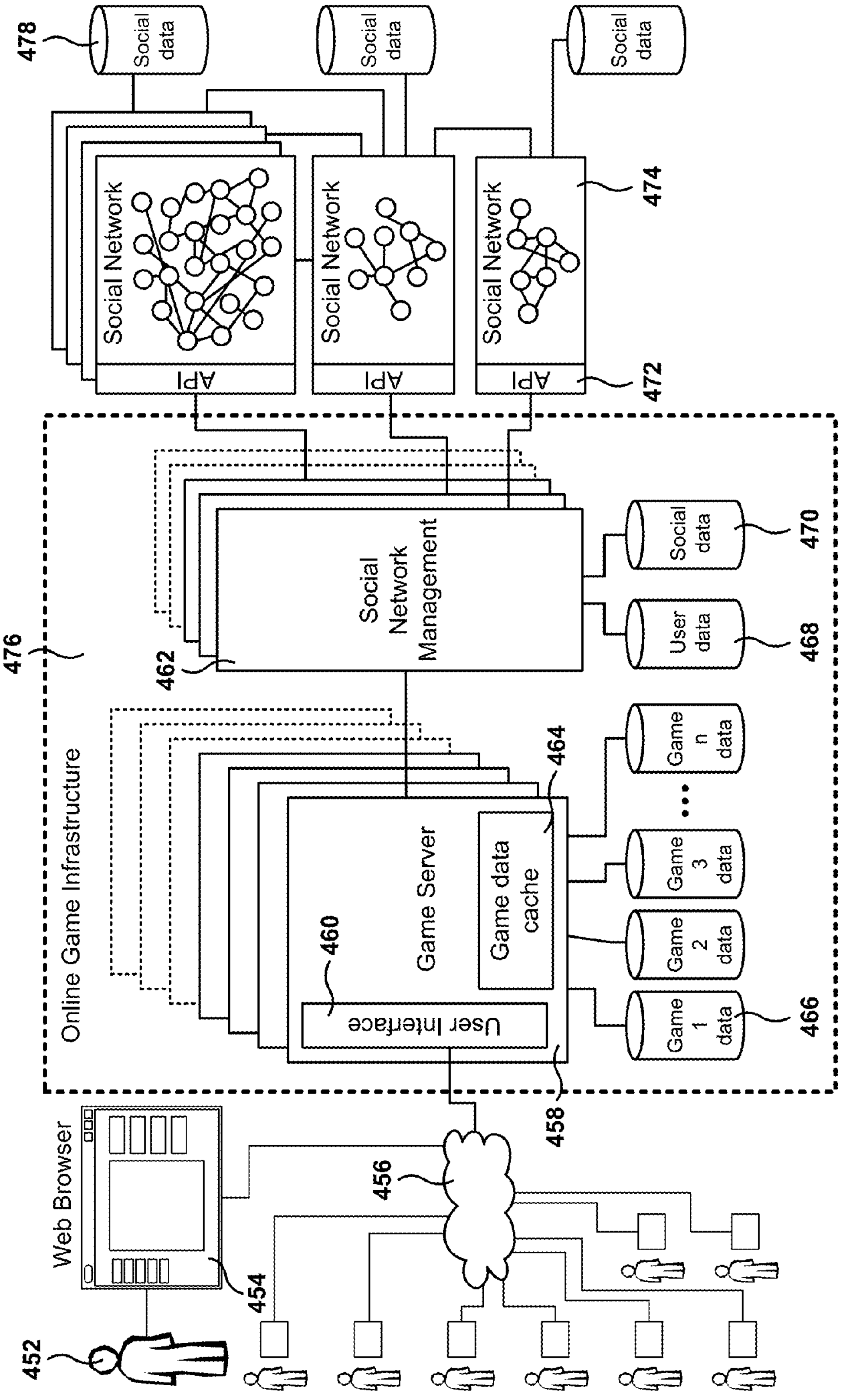
FIG. 8 illustrates an implementation of a Massively Multiplayer Online (MMO) infrastructure, according to one embodiment.

FIG. 8 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 8 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 8 should therefore not be interpreted to be exclusive or limiting, but rather exemplary or illustrative.

Figure 9:
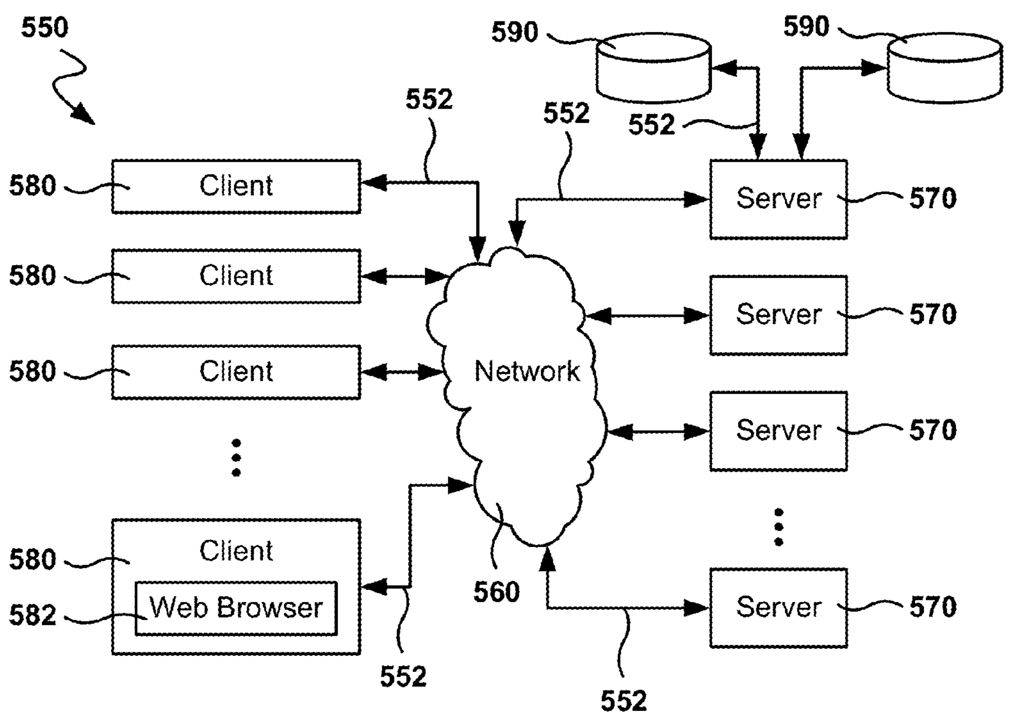
FIG. 9 illustrates an example network environment suitable for implementing embodiments.

FIG. 9 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, community server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 10:
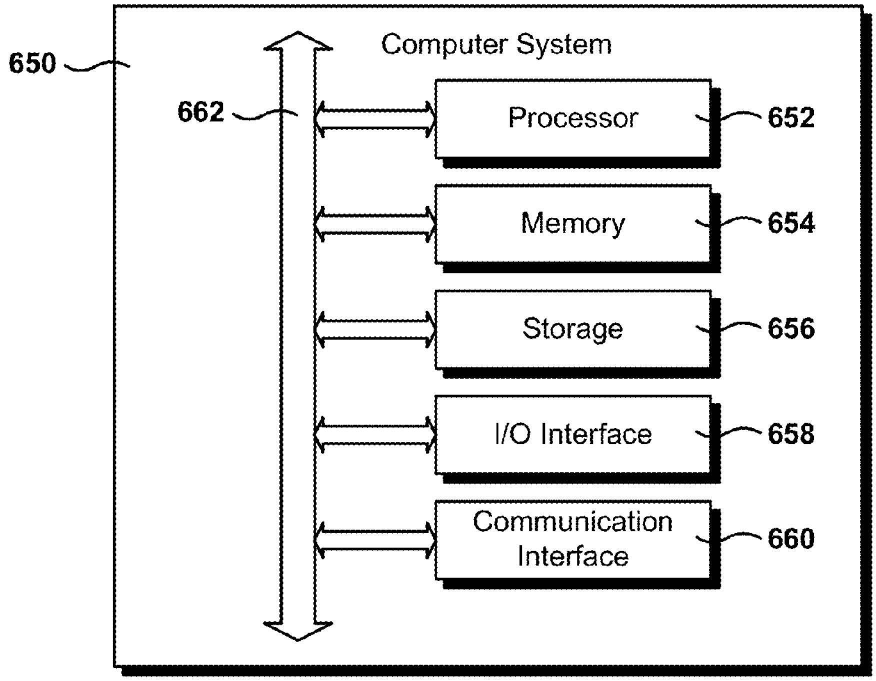
FIG. 10 illustrates an example computer system for implementing embodiments.

FIG. 10 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. § 101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

The invention claimed is:

1. A method comprising:

populating, on a client device, an initial interface for selecting a betting game for game play, the initial interface providing an option to select a single turn bet or a multiple turn bet;

detecting a selection of the multiple turn bet at the initial interface, each turn of the multiple turn bet associated with a corresponding turn multiplier;

receiving a selection of a turn multiplier for each turn of the multiple turn bet, prior to start of the betting game;

executing game operations of the betting game for a first turn of the multiple turn bet, the execution causing population of the initial interface with game content of the betting game;

computing winnings for the first turn as a function of the turn multiplier selected for the first turn and a payout determined from a payout table defined for the betting game;

executing game operations of a different betting game for each subsequent turn of the multiple turn bet, the execution causing game content of the corresponding different betting game to be provided for populating, at the client device, a different interface associated with the corresponding different betting game;

computing winnings for each subsequent turn as a function of the turn multiplier selected for each subsequent turn and a payout determined from a payout table defined for the corresponding different betting game;

adjusting total winnings of a player to account for the computed winnings of the betting game and the different betting games selected for each subsequent turn, wherein operations of the method are implemented in an algorithm that is stored in a memory and executed by a processor of a server computing system.

2. The method of claim 1, wherein the different betting game selected for each subsequent turn is at a different difficulty level than a prior turn.

3. The method of claim 1, wherein the different betting game for each subsequent turn is selected randomly.

4. The method of claim 1, wherein the different interface corresponding to the different betting game selected for each subsequent turn is provided in a portion of the initial interface.

5. The method of claim 1, further includes adjusting the turn multiplier associated with each subsequent turn based on a difficulty level of the betting game presented in the respective subsequent turn.

6. The method of claim 1, further includes progressively adjusting the turn multiplier for each subsequent turn based on an outcome of a prior turn of the multiple turn bet, the adjusted turn multiplier used in computing the winnings for each subsequent turn.

7. The method of claim 1, further includes presenting an image of the payout table of the betting game at the initial interface and an image of the payout table of the different betting game selected for each subsequent turn at the respective different interface.

8. The method of claim 1, wherein adjusting total winnings includes updating a currency counter associated with an account of the player by the computed winnings.

9. The method of claim 8, wherein the updated currency counter of the player is rendered at the initial interface of the betting game.

10. A method comprising:

populating an initial interface rendered on the client device with an option to select a single turn bet or a multiple turn bet, in response to detecting selection of a betting game for game play;

detecting a selection of the multiple turn bet, each turn of the multiple turn bet associated with a corresponding turn multiplier;

selecting a turn multiplier for each turn of the multiple turn bet, prior to start of the betting game;

executing game operations of a different betting game for each turn of the multiple turn bet, wherein the different betting game includes the betting game that was selected for game play, the executing causing a different interface associated with the different betting game to be populated with content from the corresponding different betting game selected for said each turn;

computing winnings for each turn as a function of the turn multiplier corresponding to each turn and a payout determined from a payout table defined for the corresponding different betting game;

adjusting total winnings of a player to reflect the computed winnings for each turn in the multiple turn bet.

11. The method of claim 10, wherein a difficulty level selected for the different betting game for each subsequent turn is different from a prior turn of the multiple turn bet.

12. The method of claim 10, wherein the different betting game for each subsequent turn is selected randomly and is different from the betting selected for a first turn of the multiple turn bet.

13. The method of claim 10, further includes progressively adjusting the turn multiplier for each subsequent turn based on outcome of a prior turn of the multiple turn bet, the adjusted turn multiplier used in computing the winnings for each subsequent turn.

14. The method of claim 10, further includes progressively adjusting the turn multiplier associated with each subsequent turn based on a difficulty level of the different betting game selected for the respective subsequent turn, the adjusted turn multiplier used in computing the winnings for each subsequent turn.

15. The method of claim 10, further includes presenting an image of the payout table of the different betting game at the corresponding interface for each turn of the multiple turn bet.

16. The method of claim 10, wherein each of the different betting game is selected randomly.

17. The method of claim 10, wherein operations of the method are implemented in an algorithm that is stored in memory and executed by a processor of a server that is part of cloud gaming system, wherein the server is communicatively connected to the client device via a network.

18. The method of claim 10, wherein operations of the method are implemented in an algorithm that is stored in memory and executed by a processor of the client device.

* * * * *